(12) United States Patent
Wetzig et al.

(10) Patent No.: US 10,247,637 B2
(45) Date of Patent: Apr. 2, 2019

(54) DIFFERENTIAL PRESSURE MEASUREMENT WITH FILM CHAMBER

(71) Applicant: Inficon GmbH, Köln (DE)

(72) Inventors: Daniel Wetzig, Köln (DE); Silvio Decker, Köln (DE)

(73) Assignee: INFICON GmbH, Cologne (DE)

( * ) Notice: Subject to any disclaimer, the term of this patent is extended or adjusted under 35 U.S.C. 154(b) by 0 days.

(21) Appl. No.: 15/316,782

(22) PCT Filed: Jun. 9, 2015

(86) PCT No.: PCT/EP2015/062854
§ 371 (c)(1),
(2) Date: Dec. 6, 2016

(87) PCT Pub. No.: WO2015/189219
PCT Pub. Date: Dec. 17, 2015

(65) Prior Publication Data
US 2018/0149553 A1 May 31, 2018

(30) Foreign Application Priority Data
Jun. 12, 2014 (DE) .................. 10 2014 211 228

(51) Int. Cl.
*G01M 3/32* (2006.01)

(52) U.S. Cl.
CPC ........ *G01M 3/3272* (2013.01); *G01M 3/3218* (2013.01); *G01M 3/3281* (2013.01)

(58) Field of Classification Search
CPC ............ G01M 3/00; G01M 3/02; G01M 3/10; G01M 3/26; G01M 3/32; G01M 3/3218; G01M 3/3272; G01M 3/3281
See application file for complete search history.

(56) References Cited

U.S. PATENT DOCUMENTS 4,593,554 A * 6/1986 Aarts ................ G01M 3/329
73/45.4
4,845,977 A * 7/1989 Aarts ................ G01M 3/329
73/49.3

(Continued)

FOREIGN PATENT DOCUMENTS

DE        2930364 A1 *  1/1981  ............ G01L 11/004
DE    195 13 199 A1    10/1995
(Continued)

*Primary Examiner* — Nguyen Q. Ha
(74) *Attorney, Agent, or Firm* — Kirton & McConkie; Craig Metcalf

(57) ABSTRACT

Leak detection device for measuring the differential pressure between a test chamber (10) and a reference chamber, which can be separated from the test chamber (10) gas-tight by a first check valve (24), wherein a differential pressure sensor (34) is connected to the reference chamber and to the test chamber (10) in order to measure the differential pressure between the internal pressure of the reference chamber and the internal pressure of the test chamber (10), characterized in that the test chamber (10) and the reference chamber each have at least one wall region formed from a flexible film, wherein the ratio of the test chamber volume (20) to the surface area of the flexible wall region of the test chamber (10) adjacent to the test chamber volume (20) and the ratio of the reference chamber volume to the surface area of the flexible wall region of the reference chamber adjacent to the reference chamber volume are substantially equal.

8 Claims, 1 Drawing Sheet

(56) References Cited

U.S. PATENT DOCUMENTS

| | | | |
|---|---|---|---|
| 5,600,996 A | 2/1997 | Witschi |
| 6,513,366 B1 | 2/2003 | Stauffer |

FOREIGN PATENT DOCUMENTS

| | | | |
|---|---|---|---|
| DE | 197 22 262 A1 | | 12/1998 |
| DE | 10 2012 216 868 A1 | | 3/2014 |
| EP | 0 152 981 A1 | | 8/1985 |
| EP | 0 161 702 A1 | | 11/1985 |
| EP | 0 303 303 A1 | | 2/1989 |
| EP | 0 313 678 B1 | | 6/1992 |
| EP | 0 763 722 B1 | | 8/2003 |
| FR | 2 148 466 | | 3/1973 |
| JP | 2015125044 A | * | 7/2015 |
| WO | 81/01333 | | 5/1981 |

* cited by examiner

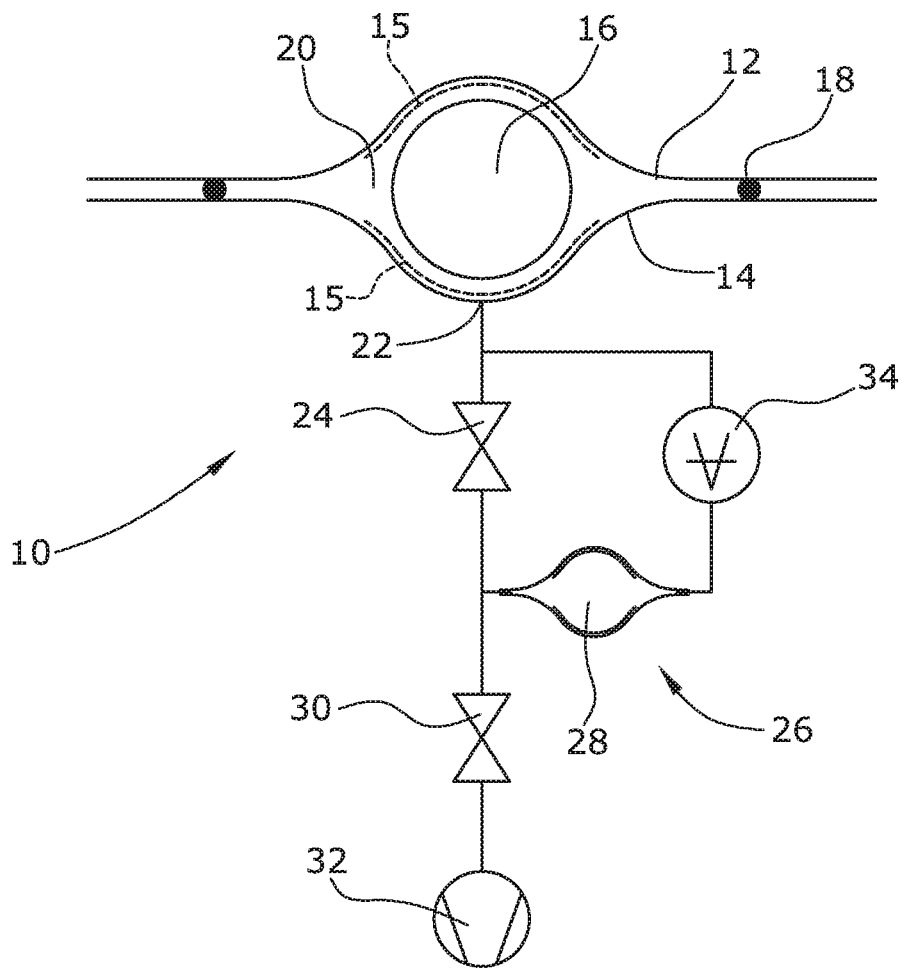

DIFFERENTIAL PRESSURE MEASUREMENT WITH FILM CHAMBER

CROSS-REFERENCES TO RELATED APPLICATIONS

This application is a National Stage of International Application No. PCT/EP2015/062854, filed Jun. 9, 2015, and entitled DIFFERENTIAL PRESSURE MEASUREMENT WITH FILM CHAMBER, which claims the benefit of DE 10 2014 211 228.1, filed Jun. 12, 2014. This application claims priority to and incorporates herein by reference the above-referenced applications in their entirety.

BACKGROUND

The invention relates to a leak detection device for the measurement of the differential pressure between a test chamber and a reference chamber, as well as to a method for the measurement of a corresponding differential pressure.

It is known to measure the pressure difference between the internal pressure in a specimen and the internal pressure in a test chamber. The specimen may be a food package. Prior to the differential pressure measurement, the specimen and the reference chamber are pressurized with the same overpressure. In case of a leaky specimen a pressure difference develops between the specimen and the reference chamber during the differential pressure measurement, since the overpressure escapes from the specimen through the leak, whereas the overpressure remains in the hermetically sealed reference chamber. The measured pressure difference serves as a measure for the leakage rate of the specimen. The advantage of differential pressure measurement is that the pressure sensor does not have to be designed for the pressures prevailing in the specimen and the reference chamber. Pressures of 10 bar may e.g. prevail in the specimen and the reference chamber, whereas the pressure sensor is designed only for a range up to 100 mbar. It is another advantage that the temperature influences on the total pressure in the specimen act analogously on the pressure in the reference chamber and thus do not influence the differential pressure.

EP 0 313 678 B1 and EP 0 763 722 B1, respectively, describe an arrangement of a test chamber holding a specimen and a reference pressure system adapted to be separated from the test chamber by means of a check valve, wherein the differential pressure between the pressure in the test chamber and the pressure in the reference pressure system is measured using a differential pressure sensor. The test chamber and the reference pressure system are each formed with rigid walls, the test chamber being designed to receive the specimen and the reference pressure system being designed as a piece of conduit. Further, a reference chamber is described which serves to pressurize the test chamber with a predefined reference pressure.

Further, film chambers for leakage tests on non-rigid specimens are known. In DE 19722262 A1 it is described to form a test chamber of a film so as to minimize the test space, i.e. the space remaining between the specimen and the test chamber. For a testing of the tightness of a non-rigid specimen, e.g. a packaging bag, in a film chamber without using test gas, the film chamber containing the specimen is evacuated and, thereafter, the rise in total pressure inside the film chamber is measured in the region outside the specimen. The film surrounding the specimen further prevents a bursting of the specimen.

For a sufficiently precise measurement of the pressure increase in the film chamber, the total pressure inside the film chamber has to be evacuated to a sufficiently low value before. A pressure (vacuum) of less than 100 mbar is necessary to achieve a sufficient measuring accuracy with total pressure measuring elements. Typically, pressures of less than 10 mbar and preferably less than 1 mbar are reached. With pressures that low, gas proportions that are degassed from the film wall of the film chamber and from a nonwoven typically arranged between the specimen and the film wall, cause an increase in pressure.

SUMMARY

It is an object of the invention to provide a leak test device for a more precise measurement of the differential pressure between a test chamber and a reference chamber.

The device of the present invention is defined by the features of claim 1.

The test chamber and the reference chamber each have walls enclosing a volume. At least a region of the test chamber wall and of the reference chamber wall is made of a flexible film, respectively. In the following, the ratio between the volume of the test chamber and the surface area of the flexible wall region adjacent the test chamber volume is referred to as the test chamber ratio. Hereinafter, the reference chamber ratio is defined as the ratio between the volume of the reference chamber and the surface area of the flexible wall region of the reference chamber adjacent the reference chamber volume. According to the invention the test chamber ratio and the reference chamber ratio are substantially equal, i.e. equal except for a difference of 20 percent at most.

In this manner it is achieved that the pressure increase in the test chamber and the reference chamber caused by gas proportions degassed from the flexible wall region is the same and that the pressure difference between the reference chamber volume and the test chamber volume is not influenced thereby. The test chamber and the reference chamber should possibly be of the same type, e.g. each should be a film chamber, so that the influences acting on the pressure in the respective chamber are as similar as possible and do not influence the differential pressure. The volume of the reference chamber should possibly be smaller than or equal to the volume in the test chamber.

In the known methods for the measurement of the differential pressure between a test chamber and a reference volume the test chamber and the reference chamber were different from each other. Outside influences acting on the respective pressure had other effects on the test chamber pressure than on the pressure in the reference volume. In test chambers with flexible wall regions, such as film chambers, differential pressure measurement was not used hitherto, since degassed gas proportions have influenced the differential pressure and have compromised the measuring result. With film chambers, the increase in total pressure within the film chamber has been measured hitherto without comparing the same to a reference pressure.

DESCRIPTION OF EMBODIMENTS

The following is a detailed description of an embodiment with reference to the FIGURE. The FIGURE shows a schematic illustration of the leak test device.

The test chamber 10 is a film chamber made of two film layers 12, 14. The two films 12, 14 enclose the specimen 16. In the edge region outside the specimen 16, the two film layers 12, 14 are joined in a gas-tight manner by means of a sealing ring 18. On the inner side facing the volume 20 of the test chamber, each film 12, 14 has a non-woven layer 15 illustrated in broken lines in the FIGURE, the nonwoven layer allowing for a better gas flow around the specimen and thus for a better evacuation. As an alternative, a rough surface of each film layer 12, 14 may be used instead of the non-woven layers 15 in order to facilitate evacuation.

The volume 20 of the test chamber 10 is connected in a gas-conducting manner with a reference chamber 26 via a gas port 22 and a first check valve 24. By closing the first check valve 24, the gas conduction path between the volume 28 in the reference chamber 26 and the test chamber volume 20 is hermetically closed. The first check valve 24 and the reference chamber 26 are connected in a gas conducting manner with a vacuum pump 32 via a second check valve 30. In the open state of the second check valve 30, the vacuum pump 32 evacuates the reference chamber 26. With both check valves 24, 30 in the open state, the vacuum pump 32 evacuates the test chamber 10 and the reference chamber 26.

A differential pressure sensor 34 is connected in a gas conducting manner both with the test chamber volume 20 and with the reference chamber volume 28. A gas exchange between the test chamber 10 and the reference chamber 26 is not possible via the differential pressure sensor 34.

The reference chamber 26 also is a film chamber designed analogous to the test chamber 10. The reference chamber 26 thus also has two film layers joined in a gas-tight manner by means of a sealing ring. On the inner side facing the volume 28 of the reference chamber 26, each film of the reference chamber 26 has a nonwoven layer shown in broken lines. As an alternative, the nonwoven layer may be replaced by a rough surface of the respective film layer.

In the non-evacuated state, the ratio between the test chamber volume 20 and the sum of the two surface areas of the two film layers 12, 14 adjacent the volume 20 define a ratio (test chamber ratio) that is equal to the corresponding ratio between the reference chamber volume 28 and the sum of the surface areas of the film layers of the reference chamber 26 adjacent the volume 28 (reference chamber volume ratio). The gas proportions degassing from the respective film layers, which reach the respective internal volume 20, 28, influence the pressure in the test chamber volume 20 and the pressure in the reference chamber volume 28 to the same degree. The pressure difference measured by the differential pressure sensor 34 is not influenced by these gas proportions.

For an evacuation of the test chamber 10 and the reference chamber 26, the vacuum pump 32 is operated with the check valves 24, 30 open. Here, a pressure of e.g. 250 mbar is obtained in the test chamber 10. Thereafter, the second check valve 30 is closed and it is waited until the pressure in the test chamber 10 is equal to the pressure in the reference chamber 26. As soon as the pressure between the chambers 10, 26 is equalized, the first check valve 24 is also closed and the pressure difference between the pressure in the test chamber volume 20 and the pressure in the reference chamber volume 28 is measured with the differential pressure sensor 34 and monitored. A change in this differential pressure is considered an indication of a leak in the specimen 16. The leakage rate of the specimen 16 can be determined from the differential pressure change.

The invention claimed is:

1. Leak detection device measuring a differential pressure between a test chamber circumscribing a first internal volume and a reference chamber circumscribing a second internal volume, which can be separated from the first internal volume of the test chamber in a gas-tight manner by a first check valve that is arranged in a gas flow path connecting the first internal volume of the test chamber with the second internal volume of the reference chamber, wherein a differential pressure sensor is arranged in another gas flow path connecting the second internal volume of the reference chamber with the first internal volume of the test chamber in order to measure the differential pressure between an internal pressure within the second internal volume of the reference chamber and an internal pressure within the first internal volume of the test chamber, wherein the test chamber and the reference chamber each have at least one wall region formed from a flexible film, wherein a ratio of the first internal volume of the test chamber to the surface area of the flexible wall region of the test chamber adjacent to the first internal volume of the test chamber and a ratio of the second internal volume of the reference chamber to the surface area of the flexible wall region of the reference chamber adjacent to the second internal volume of the reference chamber are substantially equal.

2. Leak detection device of claim 1, wherein the test chamber and the reference chamber are each formed as a film chamber.

3. Leak detection device of claim 1, wherein the reference chamber volume is smaller than or equal to the test chamber volume.

4. Leak detection device of claim 1, wherein the test chamber and the reference chamber are of a similar design.

5. Leak detection device of claim 1, wherein the inner sides of the flexible wall regions of the test chamber and the reference chamber, which are adjacent the respective inner volume, are each provided with a nonwoven layer.

6. Leak detection device of claim 1, wherein the ratios chamber volume/surface area of the flexible wall region of the test chamber and of the reference chamber differ by a maximum of 20 percent, preferably by a maximum of 5 percent.

7. Leak detection device of claim 1, wherein the first check valve and the reference chamber are connected to a vacuum pump via a second check valve, the vacuum pump serving to evacuate the test chamber and the reference chamber.

8. Method for leak detection comprising measuring a differential pressure between a test chamber and a reference chamber using the leak detection device of claim 7, wherein both check valves are opened to evacuate the test chamber and the reference chamber by means of the vacuum pump, the second check valve is closed when a predetermined pressure is reached in the test chamber, and the first check valve is closed before the start of the differential pressure measurement.

* * * * *